Sept. 10, 1929.   C. P. CARNEY   1,727,748
DOUGH CUTTER
Filed Feb. 9, 1926    2 Sheets-Sheet 1
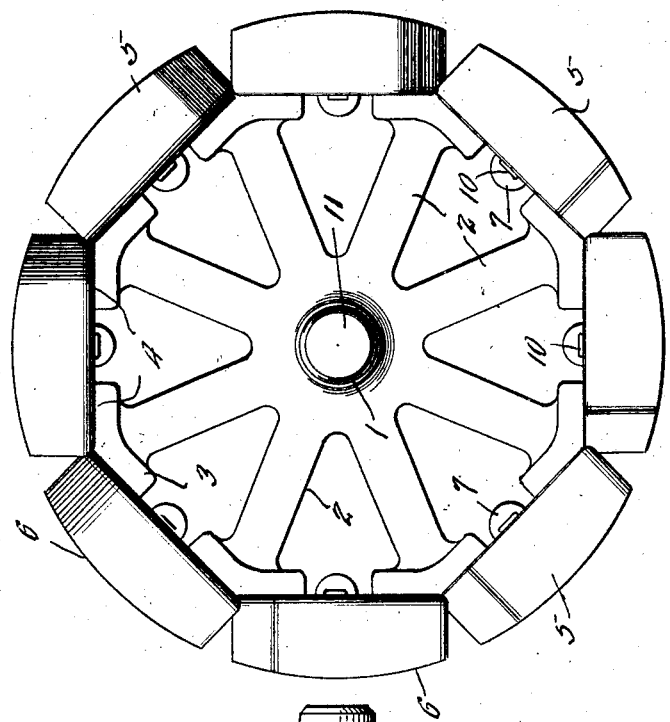
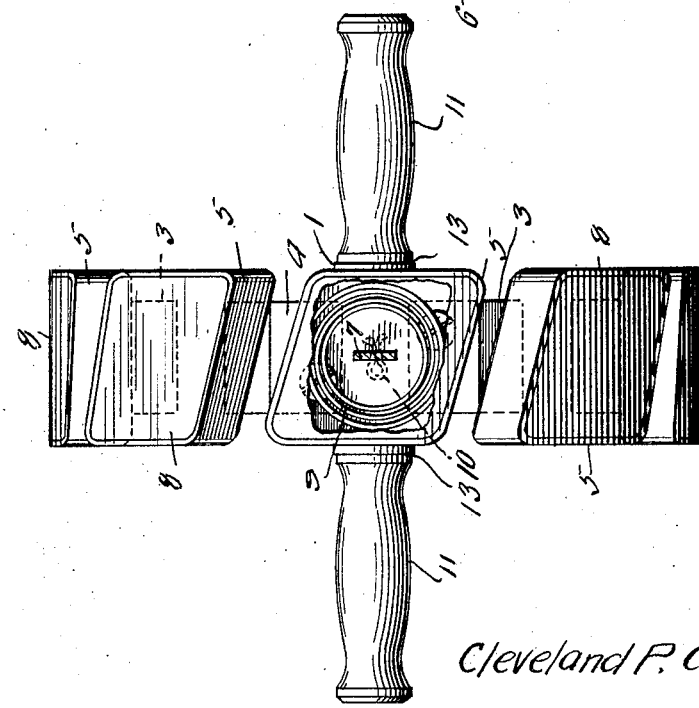
Inventor
Cleveland P. Carney
By Semmes & Semmes
Attorney Sept. 10, 1929.   C. P. CARNEY   1,727,748
DOUGH CUTTER
Filed Feb. 9 1926   2 Sheets-Sheet 2
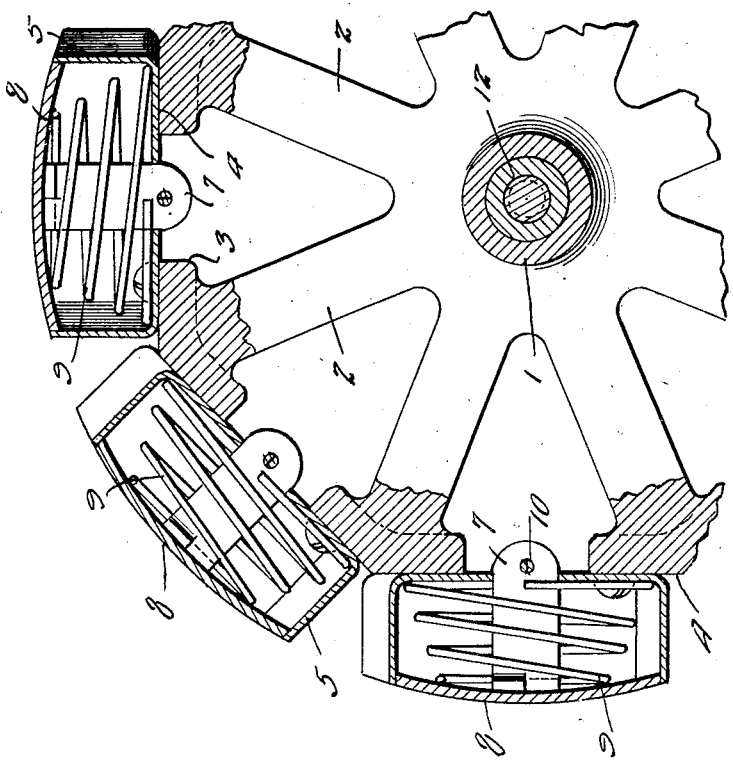
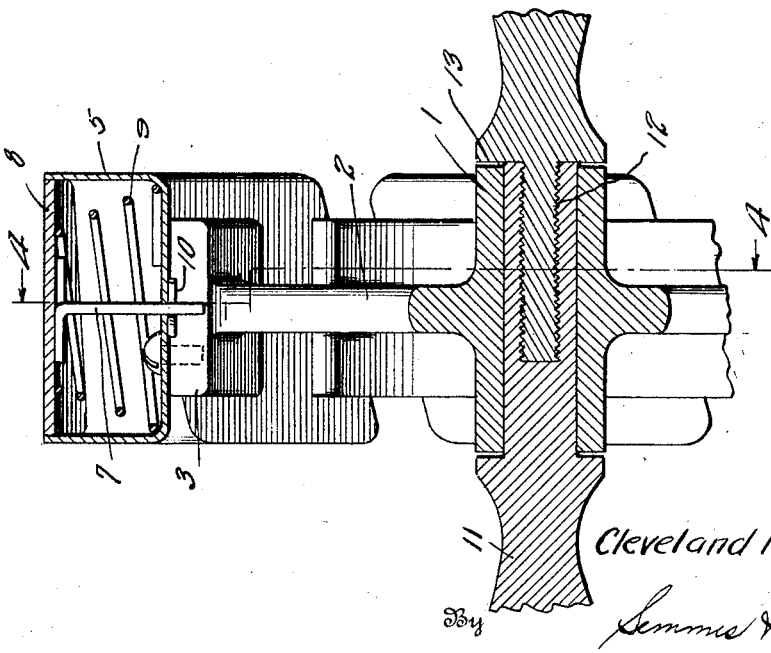
Inventor
Cleveland P. Carney
By Semmes & Semmes
Attorneys Patented Sept. 10, 1929.

1,727,748

UNITED STATES PATENT OFFICE.

CLEVELAND P. CARNEY, OF CHICAGO, ILLINOIS, ASSIGNOR TO CALUMET BAKING POWDER COMPANY, OF CHICAGO, ILLINOIS, A CORPORATION OF ILLINOIS.

DOUGH CUTTER.

Application filed February 9, 1926. Serial No. 87,089.

This invention relates to dough cutters and more particularly to the rotary type.

An object of the invention is to provide a dough cutter designed for cutting cakes or cookies by rotating the same over a batch of dough which has been previously rolled to the desired thickness.

Another object of the invention is to provide a dough cutter of the rotatable type, to construct the same in exceedingly cheap and simple manner, yet durable and efficient.

Another object of the invention is to provide a dough cutter comprising a plurality of cutting dies mounted upon contiguous supports in such a manner that the cutting edges of the dies will form a circular face, thus allowing an easy movement of the cutter in its operation.

A further object of the invention is to provide a dough cutter having a hub formed with a plurality of radially disposed and equally spaced supports or spokes. The free ends of the supports are provided with shoulders having a plurality of mounting faces disposed in different planes for the support of cutting dies. The cutting dies are mounted upon the equi-planar faces and are provided with arcuate cutting edges of such a degree that when all of the dies are mounted they will form a circular cutting face, and spring actuated ejectors are mounted in the dies for ejecting the cakes or cookies from the dies after cutting.

With these and other objects in view which may be incident to my improvements, the invention consists in the parts and combinations to be hereinafter set forth and claimed, with the understanding that the several necessary elements comprising my invention, may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular constructions, which for the purpose of explanation, have been made the subject of illustration.

In the drawings forming a part of this specification:

Figure 1 is a side elevation of the complete device.

Fig. 2 is an end elevation.

Fig. 3 is an enlarged side elevation partly in section and partly broken away, and Fig. 4 is a sectional view taken on line 4—4 Fig. 3.

Referring by numerals to the drawings, 1 indicates a hub which may be of any design, however, an elongated hub is preferable as it will prevent swaying and insure smooth running of the cutter during operation. The hub 1 has formed thereupon a plurality of radially disposed and equally spaced supports or spokes 2. Formed upon the end of the spokes 2 equally disposed from the center of the hub are shoulders 3. The shoulders 3 are provided with a plurality of mounting faces 4 disposed in different planes. The mounting faces upon the contiguous spokes are in the same plane in order to provide seats for cutting dies 5.

The cutting dies 5 are mounted upon the equi-planer faces and secured thereupon in any desirable manner. Each cutting die 5 comprises a shell which may be of any configuration or design desired. These dies are provided with arcuate cutting edges 6. The arcuate cutting edge of each die is such that when the dies are assembled a circular cutting edge will be produced in order that the cutter will run smoothly in the manipulation of the same.

The cutting dies 5 are centrally apertured to receive piston rods 7. The piston rods 7 carry arcuate plates 8 which conform to the configuration of the cutting dies and are adapted to reciprocate within the shells 5. The plates 8 are normally supported in an extended position in line with the arcuate cutting edges by coil springs 9 which are mounted within the shells 5 between the bottom of the shell and the plate 8. The plates 8 are limited in their outward movement by cotter pins 10 extending through the piston rods 7 and normally bearing against the shells 5.

Mounted in the hub 1 is a handle 11 by means of which the cutter is rotated. The handle 11 comprises two alike grips threaded together as indicated at 12. The grips are provided with shoulders 13 adapted to bear against the respective ends of the hub, to prevent side motion and insuring smooth running or rotation of the cutter as it is rotated across a layer of dough previously rolled to the desired thickness.

Operation: After assembling the cutter with cutting dies of the desired design, the same is grasped by the handle and rolled across or over a layer of dough in the same manner as a rolling pin. In rotating the cutter the cutting dies successively contact with the dough, and as the cutting die sinks into the dough the spring actuated ejector in the die is pressed down towards the bottom of the die, in which position it is held by the pressure of the dough between the ejector and the cutting board, until such time as the die has completed its cutting operation, when the spring actuated ejector forces the cake or cookie therefrom. Thus as the cutter revolves across a sheet of dough it will cut or form as many cakes or cookies as there are cutting dies mounted upon the contiguous supports.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

Having thus described the various features of my invention what I claim as new and desire to secure by Letters Patent is:

1. A dough cutter comprising a hub, a plurality of spokes upon the hub, mounting flanges upon the spokes and cutting dies mounted upon the flanges and spanning the spaces between the spokes.

2. A dough cutter comprising a hub, a plurality of radially disposed and equally spaced spokes upon the hub, shoulders upon the spokes, a plurality of mounting faces upon the shoulders, and alike cutting dies, each die mounted upon the proximate mounting faces of two adjacent spokes.

3. A dough cutter comprising a hub formed with a plurality of radially disposed spokes, shoulders upon the free ends of the spokes, a plurality of faces disposed in different planes upon each shoulder, but the proximate faces of adjacent shoulders being aligned, rhomboidal cutting dies upon aligned faces, oblique and arcuate cutting edges upon the dies, spring actuated ejectors mounted in the cutting dies, and a handle mounted in the hub.

4. A dough cutter comprising a hub formed with a plurality of radially disposed and equally spaced spokes, shoulders formed upon the free ends of the spokes, a plurality of mounting faces disposed in different planes upon the shoulders, the proximate faces of adjacent shoulders being aligned, rhomboidal cutting dies having oblique and cutting edges mounted upon the aligned faces, ejectors mounted in the cutting dies, actuating means for the ejectors and a handle journaled in the hub.

5. A dough cutter comprising a hub formed with a plurality of radially disposed and equally spaced spokes, shoulders upon the free ends of the spokes, a plurality of mounting faces disposed in different planes upon each shoulder, the proximate faces of adjacent shoulders being aligned, cutting dies mounted upon the aligned faces, oblique and arcuate rhomboidal cutting edges upon the cutting dies, spring actuated ejectors mounted in the cutting dies and a detachable handle journaled in the hub.

In testimony whereof I affix my signature.

CLEVELAND P. CARNEY.